United States Patent Office 3,478,798
Patented Nov. 18, 1969

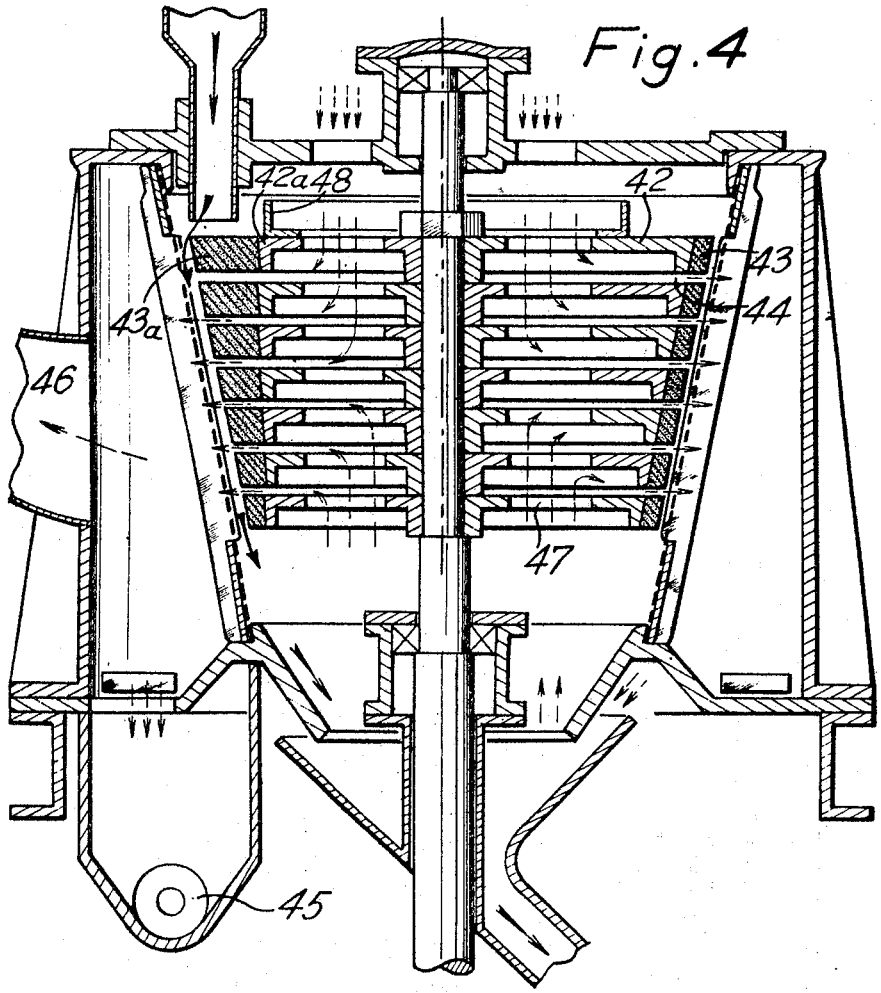
Fig. 4
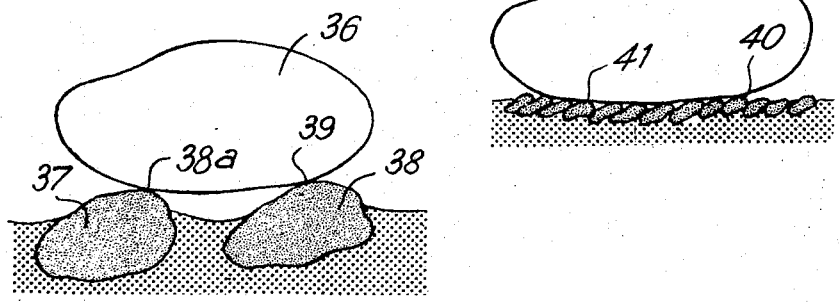
Fig. 2
Fig. 3

3,478,798
METHOD OF PROCESSING CEREALS, MORE PARTICULARLY FOR WHITENING AND POLISHING RICE, AND APPARATUS FOR PERFORMING THE SAME
Pierre Carvallo, Amposta, Tarragone, Spain
Filed Nov. 16, 1966, Ser. No. 594,881
Claims priority, application Spain, Dec. 3, 1965, 320,332, Apr. 28, 1966, 326,102
Int. Cl. B02b 3/12; B02c 9/04
U.S. Cl. 146—264                 11 Claims

ABSTRACT OF THE DISCLOSURE

A method and apparatus for processing rice and like cereals, for whitening and polishing same by abrasion with simultaneous action of an air stream, wherein the rice is subjected to the action of an abrasive body the grain size of which will pass through a No. 18 sieve while simultaneously submitting said rice grains and said abrasive body, on the entirety of its active surface, to an air stream the flow of which has an intensity sufficient for elimnating all flour resulting from the abrasion by said surface.

---

This invention relates to an improved method and apparatus for manufacturing cereals and more particularly for whitening and polishing rice.

It is the object of the invention to achieve enhanced whitening and polishing, and improved efficiency, i.e., with fewer broken grains, less flour eliminated and a smaller expenditure of motive power.

Heretofore, such work has been performed by the use of whitening and polishing cones or cylinders which rotate inside frames fitted with wire-mesh or drilled sheet-metal, and such machinery may or may not include rubber brakes. The grain to be processed is caused to pass between the cone or cylinder and the sieve elements, the flours produced by the work of the cone or cylinder passing through these elements into a circular chute from which they are collected separately.

For whitening rice, the grinding wheels used are generally made of magnesia mortars of emery, corundum or other abrasives, of grain size such that the grains will pass through No. 16 or No. 18 sieves. An abrasive of finer grain cannot be used, for otherwise the coarser rice flour would tend to clog the abrasive surface, making the latter smooth and consequently incapable of grinding.

In general, a light air suction effect is established within the grinding wheels in order to prevent flour from finding its way out of the machine and to dissipate the hot moisture resulting from the work. This light suction has no real influence, however, on the grinding or polishing work proper.

The present invention has for its object to overcome the disadvantage of the methods used heretofore and to accordingly provide a method of processing cereals and most notably of whitening and polishing rice, in accordance with which method a powerful air draught is set up over the entire working surface of the grinding wheel, preferably directed in the direction of discharge of the flour.

In this way, flour particles detached by the grinding or polishing effect are immediately carried away out of contact with the grain of rice and the abrasive, thereby considerably increasing the efficiency of the work and avoiding heating up of the grain and the undesirable brittleness and loss of whiteness ensuing therefrom.

Likewise in accordance with the invention, where whitening operations are to be carried out, the abrasive used may be of much finer grain size than is customary, ranging for instance between No. 20 and No. 60 or more, to obtain even greater fineness. Such very fine abrasives can be used without danger of clogging, due to the separating effect of the powerful stream of air. Generally speaking, the more effective the air stream, the finer may be the grain size used.

Another feature of the invention consists in blowing air over the entire work surface, across the grinding surface, in order to improve scavenging.

The invention further relates to apparatus for performing the method hereinbefore disclosed, for processing cereals and most notably for whitening and polishing rice.

In one particular form of embodiment of such apparatus, the flour collecting chute is connected to a high-power suction device, while large air mass flows are provided on the inlet side for the materials to be processed, on the exit side of the processed material, or on both at once. In order to best channel the scavenging air, those portions of the sieving surfaces which are located beyond reach of the grinding wheel are provided with occluding means to prevent a direct flow of air, said means being preferably adjustable in position to enable them to follow positional adjustment of the grinding wheel.

Yet another feature of the invention is that, for polishing work, the surface of the grinding means is made of a very hard material such as cast-iron or hardened steel, or else some elastic material such as rubber having good wear-resisting properties. Said surface may present a smooth configuration in respect of each of the parallels of the rotating body constituting the grinding wheel, but be on the contrary wavy along the meridians thereof, the overall configuration being designed to prevent the rice from dropping off too soon and emerging prematurely from the working space.

The description which follows with reference to the accompanying non-limitative exemplary drawings will give a clear understanding of how the invention can be carried into practice, any further particularities or features which emerge from the specification hereinafter naturally falling within the scope of the invention.

In the drawings:

FIGURE 2 shows on an enlarged scale a grain of rice in contact with a coarse-grained abrasive surface.

FIGURE 3 shows correspondingly a grain of rice in contact with a fine-grained abrasive surface.

FIGURE 4 shows an alternative embodiment of the apparatus in FIGURE 1, in which the grinding member consists of superimposed plates.

Figure 1:
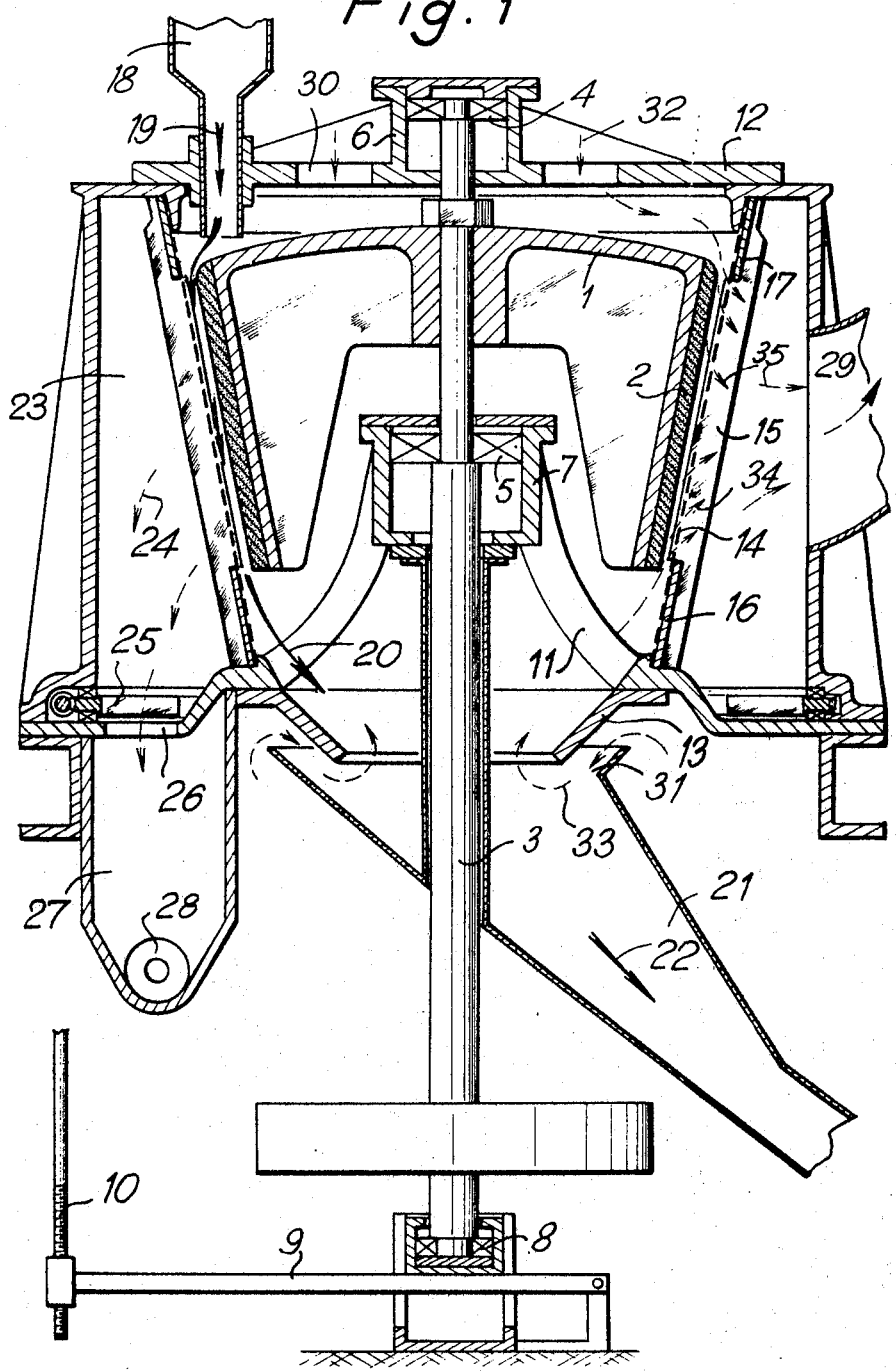
FIGURE 1 shows diagrammatically in radial section a rice whitening apparatus equipped with a conical grinding wheel.
Figure 8:
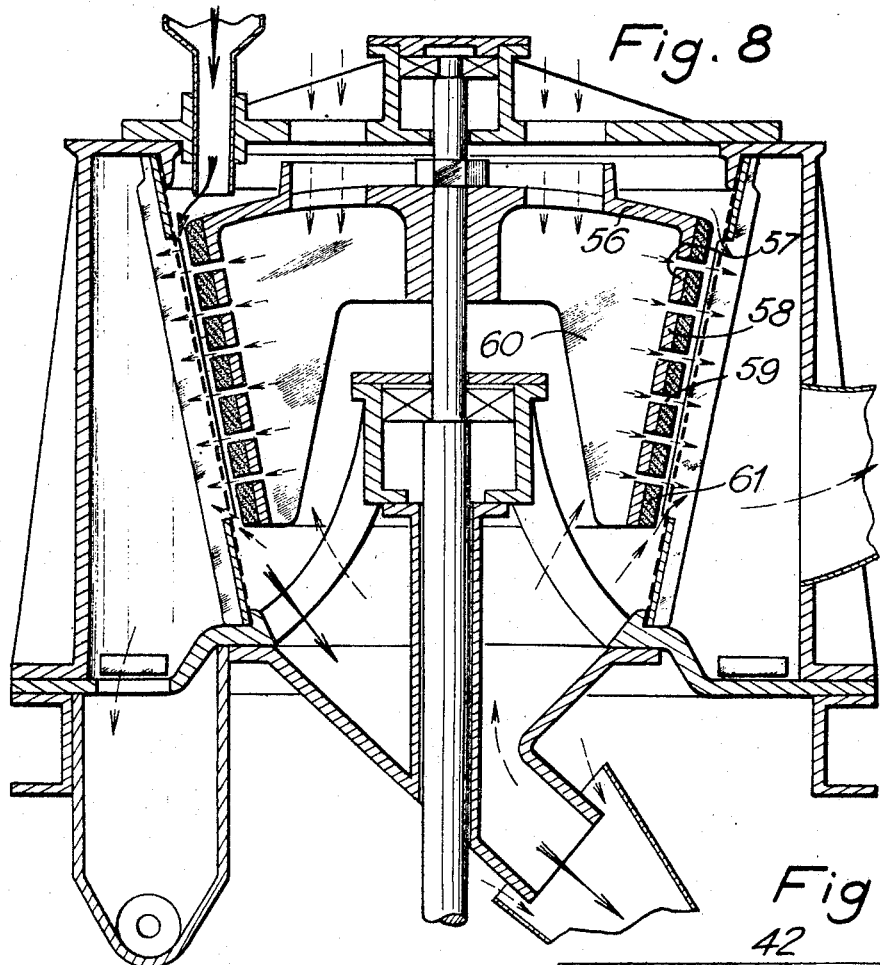
FIGURE 8 shows in section a further alternative embodiment in which the grinding member is formed with channels or rows of holes to allow air to pass through the active surface.

Referring first to FIGURE 1, the apparatus shown thereon includes a grinding body 1, the external frusto-conical active surface of which is covered with an abrasive liner 2. Through the meduim of a hub integral with the upper domed face of grinding body 1, the latter is mounted on a shaft 3 of which the bearings 4, 5 flanking said hub are contained in axially slidable housings 6 and 7 carried on the structure of the machine, and the lower end of said shaft is supported in a foot step-bearing 8 which is supported in turn by vertical adjustment means represented schematically by a lever 9 coupled through a nut to a threaded rod 10.

By means of spacers 11, the structure of the machine carries internally the housing 7, while a cover 12 fitted into the upper opening of said structure supports in its center the housing 6. Above a discharge spout 13 located at the bottom of the structure are supported frames carrying segments of wire mesh or drilled plate 14, and positioned therebetween are ribs 15 of elastic material standing slightly inwardly of the set of segments whereby to act as restraining means for preventing the processed material from being carried along in rotation by the grinding wheel.

Applied against said frames are a lower obturator 16 and an upper obturator 17 which occlude all the sieve holes other than those facing the grinding surface 2.

Mounted on cover 12, and extending therethrough up to a point just short of the periphery of the domed top of grinding body 1, is a distributor 18 through which the rice to be processed is introduced. The position of distributor 18 is such that rice entering in the direction of arrow 19 is distributed by the rotation of the dome into the space between grinding surface 2 and the sieves 14 before being discharged in the direction of arrow 20 through spout 13 and thence into a discharge chute 21, as shown by arow 22, said chute 21 being located beneath spout 13 in spaced relationship therewith.

The sieving elements 14 form the inner wall of a peripheral flour reception corridor 23. As it passes through the sieves 14 in the direction of arrows 24, the flour falls on to the annular bottom of said corridor which is swept by an annular scraper 25 driven by any convenient means and surmounting one or more openings 26 communicating with a subjacet flour discharge collector 27.

Collector 27 may be connected to the intake 28 of a powerful suction device; alternatively, corridor 23 could be associated with a suction pipe 29 likewise connected to a powerful suction device. If desired, both these means may be provided at the same time.

The resulting high negative pressure produces a powerful inrush of air through ports 30 provided in cover 12 above grinding wheel 1, as well as through the void 31 between spout 13 and chute 21. This air follows the path indicated by arrows 32 and 33 and passes through the sieves in the direction of arrows 34 and 35, carrying with it in a continuous process the flour produced by the grinding work.

Obturators 16 and 17 prevent the air from passing through directly without scavenging the work zone.

Thus, the abrasive or polishing surface operates at all times on clean grains of rice, with markedly increased effectiveness. The heat produced by this work is, moreover, dissipated immediately and directly by the scavenging air, whereby heating of the grains and its ensuing drawbacks are avoided.

As FIGURES 2 and 3 clearly show, a grain of rice 36 cooperating with relatively coarse-grained abrasive elements 37 and 38 may have only a small number of points of contact therewith 38a, 39; conversely, the same grain of rice 36 cooperating with fine abrasive grains 40 will have a far greater number of points 41 of contact therewith and, manifestly, the grinding work will be of a much higher standard in the latter case since the eroding effect, though less marked, will be far more uniform; as a result, the desired degree of whitening will be obtained with a smaller total proportion of separated flour, a smaller proportion of broken grains, a smaller expenditure of motive power and a considerably reduced total abrasive area, whereby both the size and power of the apparatus can be reduced for the same output of processed rice.

In the construction form shown in FIGURE 4, designed to further improve ventilation, the conical rotor forming the grinding body consists of a plurality of plates 42 each carrying a peripheral abrasive liner 43, and these plates are separated by gaps 44 through which passes the air sucked through conduits 45 and 46 arranged similarly to conduits 28 and 29 of FIGURE 1. Formed in each plate 42 are large apertures 47 enabling the air to reach the gaps 44 separating the plate rims, whereby the efficiency of the ventilation is enhanced throughout the work zone.

As shown on the left-hand side of FIGURE 4, advantage may be taken of this constructional form utilizing a set of juxtaposed plates for constituting the grinding body, to use plates 42a which, though identical, have abrasive surfaces 43a the dimensions of which are graded according to the position of each plate in the stack thereof. Such an arrangement permits better utilization of the abrasive down to the limit of wear, and, after it has worn out, the bottom plate can be removed and replaced by the one immediately above it, at the same time adding to the stack a top plat fitted with a new grinding liner of maxiumum thickness. Obviosuly, the shield 48 must then be fitted over the new top plate in order to prevent grain arriving through inlet 18 from accidentally reaching the locations of the apertures 47.

Figure 6:
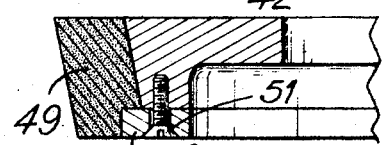
FIGURES 5, 6 and 7 show respectively in plan and in partial section on an enlarged scale constructional details of the grinding plates.
Figure 5:
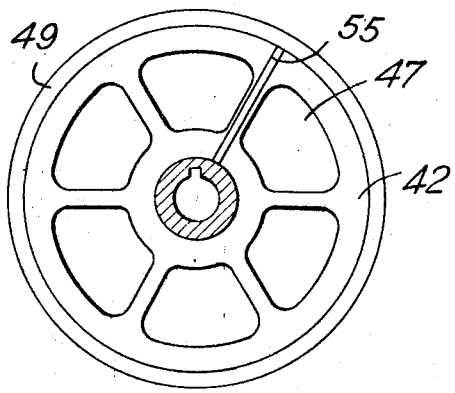

As shown in FIGURE 6, instead of using sintered magnesia liners, recourse may be had to a removable ceramic abrasive ring 49 retained by a taper fit on the plate and locked in position by a ring 50 secured to plate 42 by screws 51. In the work referred to precedingly, this will enable advantage to be taken of the benefits afforded by ceramic grinding wheels, which have superior qualities to sintered magnesia grinding surfaces.

Similar apparatus can be used when polishing is involved instead of abrasion, by replacing the grinding elements by polishing elements in the same machine. The polishing elements may be made of very hard wear-resisting materials like hardened steel or cast iron, or of an elastic material like rubber which withstands wear due to its natural elasticity.

Figure 7:
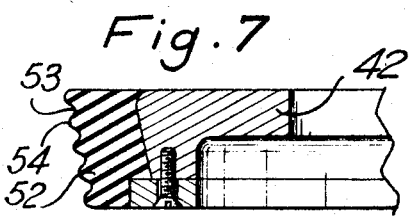

Preferably, such materials should be smooth along the parallels of their active surface, and wavy along the meridians. To that end, the device shown in FIGURE 7 consists of a plate 42 carrying a rubber liner 52 the outer surface of which is formed with grooves 53 alternating with parallel circular ribs 54, this configuration preventing the grains of rice from dropping too quickly.

In all cases where a taper fit is used it is preferable to impart a degree of elastically to each plate by slotting the same radially as shown at 55, from rim to hub.

Where it is desired to retain the same ventilation advantages with a one-piece rotor 56 of identical configuration to that of FIGURE 1 but with an outer surface 57 formed of a set of rings 58 mutually spaced by passages 59 or equivalent sets of holes, said rings are caused to be rigidly connected to internal uniting webs 60 forming spokes for the rotating body. In addition, the webs 60 perform the function of blades which assist in impelling the air.

It should be noted that the alternative adoption of circular rows of holes will improve the strength of the metal armature of the rotor.

Naturally, the abrasive liner 61 is formed with passages therethrough registering with those in said metal armature.

Manifestly, the methods and apparatus described hereinabove relate to a cone frustum of vertical axis, with its smaller base at the bottom. The method hereinbefore disclosed and the specific forms of embodiment described can apply likewise to apparatus having either revolving bodies of inverted conicity or cylindrical or bi-conical grinding wheels of horizontal axis.

It goes without saying that many changes and substitutions of parts can be made to the specific forms of embodiment hereinbefore described without departing from the scope of the invention. Most notably, instead of being entrained by suction, the air could be impelled, or be both sucked and impelled.

What I claim is:

1. An apparatus for precessing cereals for whitening and polishing rice by abrasion of the cereal grains and simultaneous action of an air stream, said apparatus comprising, an abrasive movable body having an active surface the grain size of which will pass through a sieve having a mesh size of at least No. 18, a wide air inlet disposed in the vicinity of a rice grain inlet, a wide air inlet disposed in the vicinity of a rice grain outlet, a wide air outlet disposed in a flour collecting space, means for impelling air through said air inlets and outlet, said abrasive body having an active surface extending between said grain inlets and outlets and facing said space, a sieve member surrounding said active surface in spaced relation, and adjustable obturating members on said sieve member, said obturating members being adjusted for uncovering parts of said sieve member facing only said active surface of said abrasive body, whereby there is admitted in the vicinity of said active surface and directed thereupon an air stream the flow of which has an intensity sufficient for eliminating from said cereal grains and from said active surface all flour resulting from abrasion by said active surface.

2. Apparatus as claimed in claim 1, wherein said active surface has the configuration of a surface of revolution with axial breaks in continuity.

3. Apparatus as claimed in claim 2, wherein said active surface is constituted by rims of a multiplicity of superimposed plates mutually separated by air passages, said plates having webs with parts surrounding apertures for air access to said passages.

4. Apparatus as claimed in claim 3, wherein said rims each carry a liner of corresponding thickness establishing a nearly continuous surface with adjacent liners, said rims being formed on plates of identical shape.

5. Apparatus as claimed in claim 2, wherein said active surface is constituted by a drum having a wall with at least one row of communicating apertures and an abrasive liner having grooves registering with each row.

6. Apparatus as claimed in claim 2, wherein said active surface is constituted by a drum having a wall which comprises a plurality of adjacent rings mutually separated by gaps, and an abrasive cover encasing said wall and having grooves each in registry with said gaps.

7. An apparatus for processing cereals for whitening and polishing rice by abrasion of the cereal grains and simultaneous action of an air stream, said apparatus comprising an abrasive movable body having an active surface, the grain size of which will pass through a sieve having a mesh size of at least No. 18, a wide air inlet disposed in the vicinity of a rice grain inlet, a wide air inlet disposed in the vicinity of a rice grain outlet, a wide air outlet disposed in a flour collecting space, means for impelling air through said air inlets and outlets, said abrasive body having an active surface extending between said grain inlets and outlets and facing said space, a sieve member surrounding said active surface in spaced relation, said active surface having the configuration of a surface of revolution with axial breaks in continuity and constituted by rims of a multiplicity of superimposed plates mutually separated by air passages, said plates having webs with parts surrounding apertures for air access to said air passages, whereby there is admitted in the in the vicinity of said active surface and directed thereupon an air stream, the flow of which has an intensity sufficient for eliminating from said cereal grains and from said active surface all flour resulting from abrasion by said active surface.

8. Apparatus as claimed in claim 7, wherein said rims each carry a liner of corresponding thickness establishing a nearly continuous surface with adjacent liners, said rims being formed on plates of identical shape.

9. An apparatus for processing cereals for whitening and polishing rice by abrasion of the cereal grains and simultaneous action of an air stream, said apparatus comprising an abrasive movable body having an active surface the grain size of which will pass through a sieve having a mesh size of at least No. 18, a wide air inlet disposed in the vicinity of a rice grain inlet, a wide air inlet disposed in the vicinity of a rice grain outlet, a wide air outlet disposed in a flour collecting space, means for impelling air through said air inlets and outlets, said abrasive body having an active surface extending between said grain inlets and outlets and facing said space, a sieve member surrounding said active surface in spaced relation, said active surface having the configuration of a surface of revolution with axial breaks in continuity and constituted by a drum having a wall with at least one row of communicating apertures and an abrasive liner having grooves registering with each row, whereby there is admitted in the vicinity of said active surface and directed thereupon an air stream the flow of which has an intensity sufficient for eliminating from said cereal grains and from said active surface all flour resulting from abrasion by said active surface.

10. Apparatus as claimed in claim 9, wherein said wall comprises a plurality of adjacent rings mutually separated by gaps, said liner being an abrasive cover encasing said wall and having grooves each in registry with said gaps.

11. Apparatus as claimed in claim 9, wherein said active surface includes internal spoke members to which said rings are rigidly secured and which constitute blades assisting in impelling air.

References Cited

UNITED STATES PATENTS

| | | | |
|---|---|---|---|
| 348,890 | 9/1886 | Crawford | 146—279 X |
| 753,152 | 2/1904 | Loescher | 146—279 X |
| 812,041 | 2/1906 | Holtzhausen | 146—307 X |
| 1,132,447 | 3/1915 | Cornwall | 146—279 |
| 1,345,273 | 6/1920 | Stapp | 146—279 X |
| 1,389,277 | 8/1921 | Smith | 146—264 |

FOREIGN PATENTS 714,263  9/1931  France.

JAMES M. MEISTER, Primary Examiner

U.S. Cl. X.R.

146—280, 300, 307; 241—51